United States Patent [19]

Daume

[11] Patent Number: 4,789,168
[45] Date of Patent: Dec. 6, 1988

[54] SEALING BUSH WITH A SEALING PACKING FOR HIGH PRESSURES AND TEMPERATURES

[76] Inventor: Achim Daume, Engenser Weg 1, D-3006 Burgwedel 1, Fed. Rep. of Germany

[21] Appl. No.: 940,763
[22] PCT Filed: Mar. 8, 1986
[86] PCT No.: PCT/DE86/00093
   § 371 Date: Jan. 7, 1987
   § 102(e) Date: Jan. 7, 1987
[87] PCT Pub. No.: WO86/05565
   PCT Pub. Date: Sep. 25, 1986

[30] Foreign Application Priority Data

Mar. 11, 1985 [DE] Fed. Rep. of Germany ....... 3508592

[51] Int. Cl.[4] ............................................. F16J 15/10
[52] U.S. Cl. .................................... 277/227; 277/125; 277/229; 277/230
[58] Field of Search ............... 277/102, 105, 106, 112, 277/116.4, 116.6, 123, 125, 127, 229, 230, 227

[56] References Cited

U.S. PATENT DOCUMENTS

| | | | |
|---|---|---|---|
| 4,587 | 10/1871 | Miller | 277/230 X |
| 773,949 | 11/1904 | Lockhart | 277/229 |
| 969,225 | 9/1910 | Dorsey | 277/125 X |
| 990,841 | 5/1911 | Collins | 277/123 X |
| 1,005,954 | 10/1911 | Fritz | 277/112 X |
| 1,119,803 | 12/1914 | Brown | 277/230 X |
| 2,134,671 | 10/1938 | Payne | 277/230 X |
| 2,157,867 | 5/1939 | Robertson et al. | 277/229 X |
| 3,226,126 | 12/1965 | Plate | 277/125 |
| 3,271,308 | 9/1966 | Veit et al. | 277/227 X |
| 3,534,652 | 10/1970 | Zumeta | 277/230 X |
| 3,791,658 | 2/1974 | Zumeta et al. | 277/230 |
| 4,327,923 | 5/1982 | Chesterton et al. | 277/102 X |
| 4,455,334 | 6/1984 | Ogino et al. | 277/230 X |

FOREIGN PATENT DOCUMENTS 1190750 4/1965 Fed. Rep. of Germany .
3317717 12/1984 Fed. Rep. of Germany .
448649 4/1968 Switzerland .

Primary Examiner—Robert S. Ward
Attorney, Agent, or Firm—Peter K. Kontler

[57] ABSTRACT

A sealing bush for a moving part has a packing made up of two concentric layers which are bonded to one another. The outer layer consists of a material such as graphite having good resilience. The inner layer, on the other hand, consists of a material such as sealing cord having a coefficient of friction with the moving part which is lower than the coefficient of friction between the moving part and the outer layer. The outer layer bears against the inner layer.

16 Claims, 2 Drawing Sheets

SEALING BUSH WITH A SEALING PACKING FOR HIGH PRESSURES AND TEMPERATURES

BACKGROUND OF THE INVENTION

The invention relates to a sealing bush with a sealing packing for high pressures and temperatures to be used for the sealing of components which are movably mounted between separate pressure chambers.

A wide variety of seals are used to separate two pressure chambers from one another or from the atmosphere. Numerous materials are employed for this purpose, e.g., asbestos, rubber, metal, graphite, packing cords of hemp, cotton, carbon, synthetic resins and the like. For static seals, friction between the seals and the components to be sealed is of little concern. In contrast, friction is of great concern when components move relative to each other. Significant problems arise particularly at high pressures and temperatures. Graphite has been found to be especially suitable here. It is also known to use packing cords for high temperatures. The use of graphite, however, has the disadvantages that friction is very high. The advantage is in the high chemical and thermal resistance. Moreover, graphite has outstanding resilience. Conventional packing cords which do not consist of graphite lack good resilience. After clamping, for example, by tightening the gland in a stuffing box, the cords loosen over time. This requires renewed tightening of the gland. However, glands frequently cannot be employed due to space limitations. Wear likewise results in a reduction of the sealing effect.

OBJECTS AND SUMMARY OF THE INVENTION

It is an object of the invention to so construct a sealing bush with a sealing packing that, without retightening the sealing packing, a sufficient sealing effect, for sealing packings of materials other than graphite, can be maintained over a longer time interval than for conventional designs. The invention which achieves this object is characterized in that the sealing packing is made up of two concentric layers of which the outer consists of graphite and the inner of conventional sealing cords without graphite.

The packing can be clamped by means of a simple thrust collar. The inner sealing surface of the packing then firmly contacts the component to be sealed. Due to the good resilience of the outer graphite layer, the sealing effect is maintained over a long time interval without additional clamping.

The sealing packing may be held by a rigid sleeve which can slidably receive a thrust collar under the action of a sealing force. The sealing packing may here be supported by a shoulder-like diametral constriction of the sleeve. External sealing of the sealing packing from the structural components which accommodate the same can be achieved by a sealing ring which may be slid over the shoulder-like diametral constriction from the outside.

An exemplary embodiment of the invention is schematically illustrated in the drawing and described below.

DESCRIPTION OF THE PREFERRED EMBODIMENTS

Figure 1:
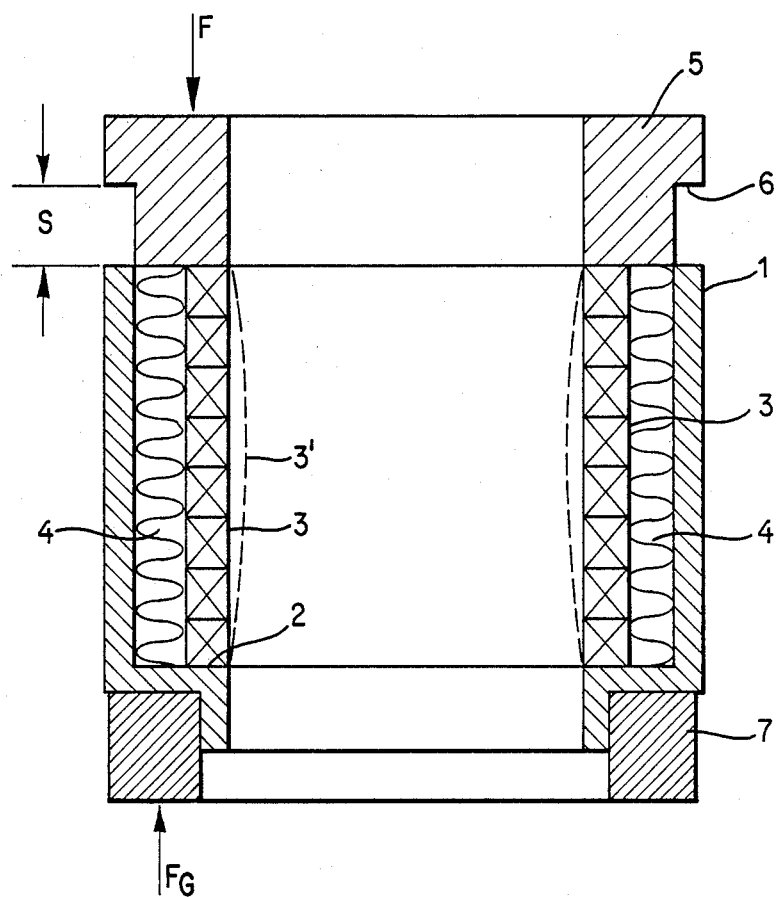
FIG. 1 a longitudinal section through a sealing bush.

The sealing bush according to the invention consists of a sleeve 1 having a diametral constriction 2 and accommodating two concentric sealing packings 3 and 4. The sealing packing 3 consists of conventional packing cords, for example, asbestos, while the packing 4 consists of graphite. The combined packing is supported by the shoulder-like diametral constriction 2 of the sleeve. A thrust collar 5 with a stop flange 6 can be pressed into the sleeve 1 so that, upon tightening under the simultaneous action of the force F and counterforce $F_G$, the inner surface of the sealing packing assumes the form indicated by the broken line 3' and bears against a component to be sealed. The thrust collar 5 can be pressed into the sleeve 1 by an amount which causes the clearance S between the upper edge of the sleeve and the stop flange 6 to go to zero. In order to prevent stress equalization via the outer surface of the sleeve 1, a sealing ring 7 is pushed onto the shoulder-like diametral constriction of the sleeve 1.

Figure 2:
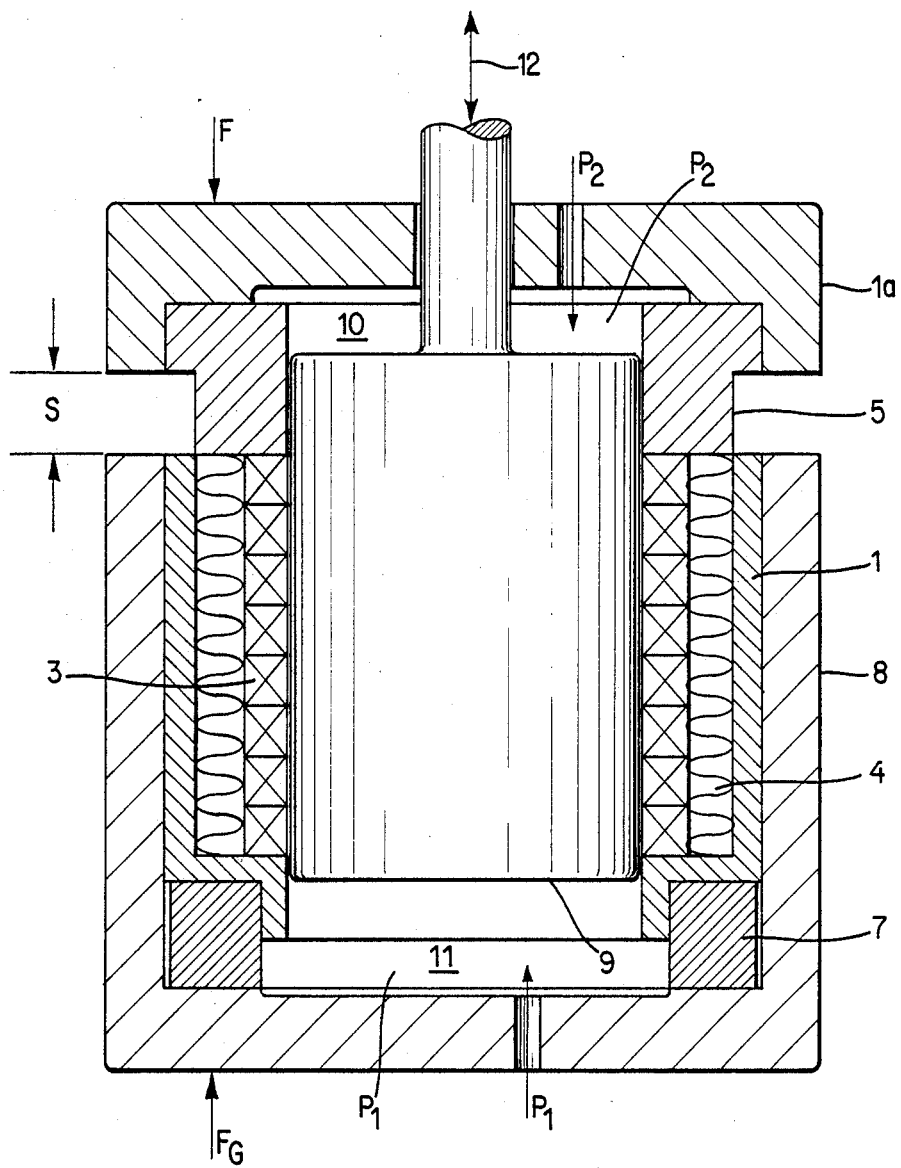
FIG. 2 an example of an installed sealing bush.

As can be seen in FIG. 2, a piston 9 is slidable in a cylinder 8. It separates the pressure chambers 10 and 11, in which different pressures P2 and P1 exist and are to be maintained, from one another. The sealing bush according to FIG. 1 is pushed into the cylinder 8 and separates the sealing chambers 10 and 11 from each other. To prevent equalization of the pressure in the pressure chamber 11 and the external pressure around the cylinder 8, the sealing ring 7 is inserted between the sleeve 1 and the bottom of the cylinder 8. A similar means may be employed at the upper end between the thrust collar 5 and the cover 1a of the cylinder, i.e., a thrust collar may be additionally provided.

Under dynamic loading, that is, during movement of the piston 9 in the direction of the double-headed arrow 12, high friction would be generated if a sealing packing of graphite were used exclusively. Due to the characteristics of the sealing packing in accordance with the invention—clearly illustrated in FIG. 1—a sufficient sealing effect is established between the inner packing layer 3 and the piston. By virtue of the good resilience of the outer packing layer 4 of graphite, the contact pressure of the packing cord 3 is maintained for a long period of time without the need to change the position of the thrust collar 5 by retightening the cover 1a of the cylinder. The size of the pressure chamber 10 can thus be kept constant over this period of time. The same advantage is obtained when the inner sealing packing 3 undergoes wear in that such wear may be compensated for over a long period of time with appropriate resilience of the outer sealing packing layer 4.

I claim:

1. A sealing device for moving parts, particularly for use at high pressures and temperatures, comprising a packing having two layers, one of said layers surrounding the other of said layers and being more resilient than said other layer, and the coefficient of friction between said other layer and a moving part being lower than the coefficient of friction between said one layer and the moving part, said layers being pressed together so that said one layer resiliently bears upon said other layer.

2. The sealing device of claim 1 wherein said layers are substantially concentric with one another.

3. The sealing device of claim 1, wherein said one layer consists essentially of graphite.

4. The sealing device of claim 3, wherein said other layer is substantially free of graphite.

5. The sealing device of claim 4, wherein said other layer comprises a sealing cord.

6. The sealing device of claim 1, comprising a sleeve; and wherein said packing is disposed in said sleeve.

7. The sealing device of claim 6, wherein said sleeve is rigid.

8. The sealing device of claim 6, comprising a thrust collar designed to be inserted in said sleeve.

9. The sealing device of claim 6, said sleeve including a first section having a first cross-sectional area, and a second section having a smaller second cross-sectional area, and said first and second sections defining an inner shoulder internally of said sleeve; and wherein said packing abuts said shoulder.

10. The sealing device of claim 9, comprising a sealing element which is mounted on and circumscribes said second section.

11. The sealing device of claim 10, said first and second sections defining an outer shoulder externally of said sleeve; and wherein said sealing element abuts said outer shoulder.

12. The sealing device of claim 10, wherein said sleeve and said sealing element have substantially circular outlines.

13. The sealing device of claim 6, wherein said sleeve and said packing have substantially circular outlines.

14. The sealing device of claim 6, said sleeve having an end face; and further comprising a thrust collar designed to be inserted in said sleeve, said thrust collar having a flange arranged to abut said end face when said thrust collar penetrates into said sleeve by a predetermined amount.

15. The sealing device of claim 6, comprising a thrust collar designed to be inserted in said sleeve; and wherein said sleeve, said packing and said thrust collar together define a substantially complete sealing unit for a moving part.

16. The sealing device of claim 1, wherein said layers are pressure-bonded to one another.

* * * * *